(12) United States Patent
Tang (10) Patent No.: US 11,146,972 B2
(45) Date of Patent: Oct. 12, 2021

(54) INFORMATION TRANSMISSION METHOD AND DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/092,388

(22) PCT Filed: Jun. 24, 2016

(86) PCT No.: PCT/CN2016/087095
§ 371 (c)(1),
(2) Date: Oct. 9, 2018

(87) PCT Pub. No.: WO2017/219363
PCT Pub. Date: Dec. 28, 2017

(65) Prior Publication Data
US 2019/0116578 A1  Apr. 18, 2019

(51) Int. Cl.
*H04W 24/02* (2009.01)
*H04W 48/12* (2009.01)
(Continued)

(52) U.S. Cl.
CPC .......... *H04W 24/02* (2013.01); *H04L 5/0053* (2013.01); *H04W 4/06* (2013.01); *H04W 48/12* (2013.01);
(Continued)

(58) Field of Classification Search
CPC ....... H04W 14/02; H04W 48/12; H04W 4/06; H04W 76/27; H04W 72/005; H04W 48/14; H04W 80/02; H04L 5/0053
See application file for complete search history.

(56) References Cited

U.S. PATENT DOCUMENTS

2013/0039250 A1  2/2013  Hsu
2014/0086196 A1  3/2014  Zhu
(Continued)

FOREIGN PATENT DOCUMENTS

CN     1841945 A    10/2006
CN   101128031 A     2/2008
(Continued)

OTHER PUBLICATIONS

Kim, "Control method for supporting multiple connections in mobile communication system and apparatus for supporting multiple connections", Apr. 20, 2016, CN, CN105519167, English machine language translation. (Year: 2016).*
(Continued)

*Primary Examiner* — Paul H Masur
*Assistant Examiner* — Michael K Phillips
(74) *Attorney, Agent, or Firm* — Ladas & Parry LLP (57) ABSTRACT

Embodiments of the present invention provide an information transmission method and apparatus. The method comprises: a first device obtains first indication information sent by a second device, the first indication information being used for indicating first system information required by the second device; and the first device sends the first system information according to the first indication information. By means of the embodiments of the present application, the sending efficiency can be improved, signaling overheads can be reduced, and a resource waste can be avoided.

17 Claims, 4 Drawing Sheets

100

A second device transmits first indication information to a first device, the first indication information indicating first system information required by the second device — 110

The second device acquires the first system information transmitted by the first device. — 120

(51) Int. Cl.

| | | |
|---|---|---|
| *H04W 4/06* | (2009.01) | |
| *H04W 76/27* | (2018.01) | |
| *H04L 5/00* | (2006.01) | |
| *H04W 72/00* | (2009.01) | |
| *H04W 48/14* | (2009.01) | |
| *H04W 80/02* | (2009.01) | |

(52) U.S. Cl.
CPC ......... *H04W 72/005* (2013.01); *H04W 76/27* (2018.02); *H04W 48/14* (2013.01); *H04W 80/02* (2013.01)

(56) References Cited

U.S. PATENT DOCUMENTS

| | | | |
|---|---|---|---|
| 2015/0195774 A1 | 7/2015 | Lee et al. | |
| 2015/0245193 A1 | 8/2015 | Xiong et al. | |
| 2015/0256995 A1 | 9/2015 | Rune et al. | |
| 2016/0007271 A1 | 1/2016 | Plicanic Samuelsson et al. | |
| 2016/0234759 A1* | 8/2016 | Kubota | H04W 48/14 |
| 2016/0249183 A1 | 8/2016 | Kim et al. | |
| 2016/0353473 A1* | 12/2016 | Chen | H04W 72/1273 |
| 2017/0164407 A1 | 6/2017 | Yang et al. | |
| 2017/0265165 A1* | 9/2017 | Li | H04W 72/046 |
| 2017/0311285 A1* | 10/2017 | Ly | H04W 74/0833 |
| 2017/0311290 A1* | 10/2017 | Adjakple | H04W 16/02 |
| 2017/0367120 A1* | 12/2017 | Murray | H04B 7/0695 |
| 2017/0373902 A1* | 12/2017 | Zhang | H04W 4/70 |
| 2019/0053131 A1* | 2/2019 | Suzuki | H04W 8/24 |
| 2019/0074953 A1* | 3/2019 | Tooher | H04L 27/2605 |
| 2019/0159110 A1* | 5/2019 | Takahashi | H04W 48/14 |
| 2021/0068156 A1* | 3/2021 | Suzuki | H04W 74/04 |

FOREIGN PATENT DOCUMENTS

| | | | | |
|---|---|---|---|---|
| CN | 101217689 A | | 7/2008 | |
| CN | 101536597 A | | 9/2009 | |
| CN | 101959286 A | | 1/2011 | |
| CN | 102271416 A | * | 12/2011 | |
| CN | 102378391 A | | 3/2012 | |
| CN | 102396269 A | | 3/2012 | |
| CN | 102474473 A | | 5/2012 | |
| CN | 102802254 A | | 11/2012 | |
| CN | 103179513 A | | 6/2013 | |
| CN | 103856923 A | | 6/2014 | |
| CN | 103856923 A | * | 6/2014 | |
| CN | 104601266 A | | 5/2015 | |
| CN | 104641691 A | | 5/2015 | |
| CN | 105027470 A | | 11/2015 | |
| CN | 105165063 A | | 12/2015 | |
| CN | 105409147 A | | 3/2016 | |
| CN | 105519167 A | * | 4/2016 | H05K 999/99 |
| EP | 2742621 A4 | | 5/2015 | |
| EP | 2880919 A1 | | 6/2015 | |
| EP | 2912891 A1 | | 9/2015 | |
| JP | 2018504859 A | * | 2/2018 | |
| JP | 2018504859 A | | 2/2018 | |
| TW | 201429174 A | | 7/2014 | |
| WO | 2011050564 A1 | | 5/2011 | |
| WO | 2014070048 A1 | | 5/2014 | |
| WO | WO-2014070048 A1 | * | 5/2014 | H04W 8/186 |
| WO | 2014082454 A1 | | 6/2014 | |
| WO | 2014129951 A1 | | 8/2014 | |
| WO | WO-2014129951 A1 | * | 8/2014 | H04W 74/04 |
| WO | 2015060608 A1 | | 4/2015 | |
| WO | 2015199491 A1 | | 12/2015 | |
| WO | 2016130354 A1 | | 8/2016 | |
| WO | WO-2017135052 A1 | * | 8/2017 | H04W 24/08 |

OTHER PUBLICATIONS

Suzuki et al., "Terminal device, base station device, communications method, and integrated circuit", Aug. 10, 2017, WIPO, WO 2017135052, English machine language translation (Year: 2017).*

Huang et al., "Method And Device for Generating Random Access Limit Set Leader Sequences in LTE (Long Term Evolution) System", Dec. 7, 2011, CN, CN 102271416, English machine language translation (Year: 2011).*

Supplementary European Search Report in European application No. 16905904.5, dated Feb. 11, 2019.

English Translation of the Written Opinion of the International Search Authority in international application No. PCT/CN2016/087095, dated Mar. 22, 2017.

Samsung "System Information Signalling Design in NR" 3GPP TSG-RAN WG2 Meeting #94, R2-163371, May 27, 2016 (May 27, 2016).

First Office Action of the Chinese application No. 201680084842.7, dated Aug. 21, 2019.

Second Office Action of the Chinese application No. 2016800134842. 7, dated Oct. 31, 2019.

International Search Report in international application No. PCT/CN2016/087095, dated Mar. 22, 2017.

Written Opinion of the International Search Authority in international application No. PCT/CN2016/087095, dated Mar. 22, 2017.

Third Office Action in corresponding Chinese application No. 201680084842.7, dated Feb. 3, 2020.

First Office Action in corresponding Japanese application No. 2018-556987, dated Apr. 3, 2020.

Ericsson; "Requirements for System Information distribution"; 3GPP TSG-RAN WG2 #94 Tdoc R2-164006 Nanjing, P. R. China, May 23-27, 2016.

LG Electronics Inc; "Observations about on-demand SI delivery mechanism"; 3GPP TSG-RAN WG2 #94 R2-164076 Nanjing, China, May 23-27, 2016.

Qualcomm Incorporated, Convida Wireless; "NR System Information Provisioning"; 3GPP TSG-RAN WG2 Meeting #94 R2-164122 Nanjing, Chaina May 23-27, 2016.

Huawei, HiSilicon; "System information design"; 3GPP TSG-RAN2 Meeting #94 R2-164127 Nanjing, China, May 23-27, 2016.

Fourth Office Action of the Chinese application No. 201680084842. 7, dated May 27, 2020.

Office Action of the Indian application No. 201617047525, dated Jul. 22, 2020.

Written Opinion of the Singaporean application No. 11201901609S, dated Mar. 3, 2020.

First Office Action of the Canadian application No. 3022637, dated Sep. 3, 2019.

Decision of Refusal of the Japanese application No. 2018-556987, dated Nov. 27, 2020.

Notice of Re-examination of the Chinese application No. 201680084842. 7, dated Feb. 2, 2021.

Notice of Re-examination of the Chinese application No. 201680084842. 7, dated May 20, 2021.

Office Action of the Taiwanese application No. 106119698, dated Jun. 30, 2021.

European Search Report in the European application No. 21167822. 2, dated Jul. 14, 2021.

* cited by examiner

100

```
A second device transmits first indication information
to a first device, the first indication information
indicating first system information required by the
second device
```
110

```
The second device acquires the first system
information transmitted by the first device.
```
120

```
A first device acquires first indication information
transmitted by a second device, the first indication
information indicating first system information
required by the second device.
```
210

```
The first device transmits the first system information
according to the first indication information
```
220

INFORMATION TRANSMISSION METHOD AND DEVICE

RELATED APPLICATION

This application is an application under 35 U.S.C. 371 of International Application No. PCT/CN2016/087095 filed on Jun. 24, 2016, the entire contents of which are incorporated herein by reference.

TECHNICAL FIELD

The present disclosure refers to the field of communications, and more particularly to a method and device for information transmission.

BACKGROUND

In the existing Long Term Evolution (LTE) system, after establishing downlink synchronization information with the serving cell, the terminal may receive system information that is transmitted by the serving cell through a broadcast signaling to obtain information associated with the serving cell.

System information is periodically transmitted in the cell by means of a broadcast. The transmission efficiency of such system information transmission method is low, the signaling overhead is large, and the waste of resources is also large.

SUMMARY

The present disclosure provides a method and device for information transmission, which can improve the transmission efficiency and reduce the signaling overhead, thereby the waste of resources is avoided.

In the first aspect, a method for information transmission is provided. The method includes a first device acquires first indication information transmitted by a second device, the first indication information is used to request first system information required by the second device; and the first device transmits the first system information according to the first indication information.

Therefore, system information can be transmitted only if there is a device which requires the system information and a trigger request for the system information is transmitted, which ensures that the system information can be acquired by the device in time, the transmission efficiency of the system can be improved and the signaling overhead can be reduced, thereby the utilization of resources can be improved.

In combination with the first aspect, in a first possible implementation of the first aspect, the first device transmits the first system information according to the first indication information may include: the first device transmits the first system information according to the first indication information by means of a broadcast or a multicast.

Therefore, the first device transmits the system information by means of a broadcast or a multicast after receiving a trigger request for the system information from the second device, so that not only the second device can acquire the system information in time, but also other devices can acquire the system information in an idle state, power consumption and signaling waste caused by converting the other devices from the idle state to a connection state and requesting for the system information from the first device can be avoided when the other devices need to acquire the system information.

Optionally, the first device transmits the first system information according to the first indication information may include: the first device transmits the first system information according to the first indication information by means of a unicast.

In combination with the first aspect or any of above possible implementation, in a second possible implementation of the first aspect, both the first device and the second device are terminal devices; or the first device is a network device and the second device is a terminal device.

In combination with the first aspect or any of above possible implementation, in a third possible implementation of the first aspect, the first device acquires the first indication information transmitted by the second device may include: the first device acquires the first indication information transmitted by the second device, herein the first indication information is one of first physical layer indication information, first Media Access Control (MAC) layer indication information, or first Radio Resource Control (RRC) layer indication information.

In combination with the first aspect or any of above possible implementation, in a fourth possible implementation of the first aspect, the first device acquires the first indication information transmitted by the second device may include one of: the first device can acquire the first physical layer indication information transmitted by the second device via one or a combination of the physical layer channel, the physical layer resource block or the physical layer sequence, herein, each or a combination of the physical layer channel, the physical layer resource block and the physical layer sequence corresponds to the first system information; the first device acquires the first MAC layer indication information from a control domain, which corresponds to the first system information, in a MAC layer message or from a control bit, which corresponds to the first system information, in a reserved control domain of a MAC layer message, herein the MAC layer message is from the second device; or the first device acquires the first RRC layer indication information from a control domain, which corresponds to the first system information, in a RRC layer message or from a control bit, which corresponds to the first system information, in a reserved control domain of a RRC layer message, herein the RRC layer message is from the second device.

In combination with the first aspect or any of above possible implementation, in a fifth possible implementation of the first aspect, the method may further include: the first device transmits second indication information, herein the second indication information indicating system information which can be transmitted by the first device.

Optionally, the first device may broadcast the second indication information.

In combination with the first aspect or any of above possible implementation, in a sixth possible implementation of the first aspect, the first device broadcasts the second indication information may include: the first device broadcasts the second indication information, herein the second indication information is one of second physical layer indication information, second MAC layer indication information or second RRC layer indication information.

In combination with the first aspect or any of above possible implementation, in a seventh possible implementation of the first aspect, the first device broadcasts the second indication information comprises one of: the first device transmits the second physical layer indication information corresponding to different system information or different system information sets through one of different physical layer channels, different physical resource blocks, or different physical layer sequences; the first device carries the second RRC layer indication information corresponding to different system information or system information sets through different control domains of a RRC message or through different bits of a same control domain of a RRC message; or the first device carries the second MAC layer indication information corresponding to different system information or system information sets through different control domains of a MAC message or through different bits of a same control domain of a MAC message.

In combination with the first aspect or any of above possible implementation, in an eighth possible implementation of the first aspect, the system information comprises at least one of: information associated with cell selection and resident, scheduling information of information block in which the system information is located, access restriction information, common channel parameters, configuration information of subframes of MBSFN, information associated with cell reselection, reselection information of cells with a same frequency, reselection information of cells with different frequencies, reselection information of cells with different systems, reselection information of cells with different systems, or reselection information of cells with different systems.

In combination with the first aspect or any of above possible implementation, in a ninth possible implementation of the first aspect, the method may further include: the first device determines second system information, wherein the second system information is system information associated with the first system information; and the first device transmits the second system information.

In combination with the first aspect or any of above possible implementation, in a tenth possible implementation of the first aspect, the first device determines the second system information may include at least one of: the first device determines other system information in the system information set to which the first system information belongs as the second system information; and/or the first device determines other system information utilized by a service utilizing the first system information as the second system information.

In a second aspect, a method for information transmission is provided. The method include: a first device determines that system information needs to be transmitted, when a signal is detected on resources for transmitting first indication information by the first device, herein the first indication information is used to request for the system information; and the first device transmits the system information.

In combination with the second aspect or any of above possible implementation, in a first possible implementation of the second aspect, the first device transmits the system information include: a terminal device which is capable of transmitting the first indication information using the resources is determined; and the first device transmits the system information may further include: the system information is transmitted to the terminal device.

In combination with the second aspect or any of above possible implementation, in a second possible implementation of the second aspect, the resources are one or a combination of at least two of a physical channel, a physical resource block, an antenna port or a sequence of code words.

In a third aspect, a method for information transmission is provided. The method include: a second device transmits first indication information to a first device, the first indication information indicating first system information required by the second device; and the second device acquires the first system information transmitted by the first device.

In combination with the third aspect or any of above possible implementation, in a first possible implementation of the third aspect, the second device acquires the first system information transmitted by the first device may include: the second device acquires the first system information transmitted by the first device by means of one of a broadcast, a multicast or a unicast.

In combination with the third aspect or any of above possible implementation, in a second possible implementation of the third aspect, both the first device and the second device are terminal devices; or the first device is a network device, the second device is a terminal device.

In combination with the third aspect or any of above possible implementation, in a third possible implementation of the third aspect, the second device transmits the first indication information to the first device, herein the first indication information is one of first physical layer indication information, first Media Access Control (MAC) layer indication information, or first Radio Resource Control (RRC) layer indication information.

In combination with the third aspect or any of above possible implementation, in a fourth possible implementation of the third aspect, the second device transmits the first indication information to the first device may include one of: the second device transmits the first physical layer indication information through one or a combination of a physical layer channel, a physical layer resource block or a physical layer sequence, herein each or a combination of the physical layer channel, the physical layer resource block and the physical layer sequence corresponds to the first system information; the second device transmits the first MAC layer indication information through a control domain, which corresponds to the system information, in a MAC message or through a control bit, which corresponds to the first system information, in a reserved control domain of a MAC message; or the second device transmits the first RRC layer indication information through a control domain, which corresponds to the system information, in a RRC message or through a control bit, which corresponds to the first system information, in a reserved control domain of a RRC message.

In combination with the third aspect or any of above possible implementation, in a fifth possible implementation of the third aspect, the method may further include: before the second device transmits the first MAC layer indication information or the first RRC layer indication information: the second device determines that the physical layer of the second device performs information transmission by means of sharing channel.

In combination with the third aspect or any of above possible implementation, in a sixth possible implementation of the third aspect, before the second device transmits the first indication information to the first device, the second device acquires second indication information transmitted by the first device, herein the second indication information indicating system information which can be transmitted by the first device; the second device transmits the first indication information to the first device may include the second device transmits the first indication information to the first device according to the second indication information, herein the first system information belongs to the system information which can be transmitted by the first device.

In combination with the third aspect or any of above possible implementation, in a seventh possible implementation of the third aspect, the second device acquires the second indication information transmitted by the first device may include: the second device acquires second physical layer indication information, second MAC layer indication information or second RRC layer indication information which are transmitted by the first device.

In combination with the third aspect or any of above possible implementation, in an eighth possible implementation of the third aspect, the second device acquires the second physical layer indication information, the second MAC layer indication information or the second RRC layer indication information which are transmitted by the first device includes one of: the second device acquires the second physical layer indication information corresponding to different system information or different system information sets via one of different physical layer channels, different physical resource blocks, or different physical layer sequences; the second device acquires the second RRC layer indication information corresponding to different system information or different system information sets from different control domains of a RRC message or from different control bits of a same control domain of a RRC message; or the second device acquires the second MAC layer indication information corresponding to different system information or different system information sets from different control domains of a MAC message or from different control bits of a same control domain of a MAC message.

In combination with the third aspect or any of above possible implementation, in a ninth possible implementation of the third aspect, the system information includes at least one of the following information: information associated with cell selection and resident, scheduling information of information block in which the system information is located, access restriction information, common channel parameters, configuration information of subframes of MBSFN, information associated with cell reselection, reselection information of cells with a same frequency, reselection information of cells with different frequencies, reselection information of cells with different systems, reselection information of cells with different systems, or reselection information of cells with different systems.

In combination with the third aspect or any of above possible implementation, in a tenth possible implementation of the third aspect, the method may further include: the second device receives second system information transmitted by the first device, wherein the second system information is system information associated with the first system information.

In a fourth aspect, a device for information transmission is provided. The device is configured to perform the method in the above first aspect and any optional implementation of the first aspect. Specifically, the device for information transmission includes module units configured to perform the method in the above first aspect and any optional implementation of the first aspect.

In a fifth aspect, a device for information transmission is provided. The device is configured to perform the method in the above second aspect and any optional implementation of the second aspect. Specifically, the device for information transmission includes module units configured to perform the method in the above second aspect and any optional implementation of the second aspect.

In a sixth aspect, a device for information transmission is provided. The device is configured to perform the method in the above third aspect and any optional implementation of the third aspect. Specifically, the device for information transmission includes module units configured to perform the method in the above third aspect and any optional implementation of the third aspect.

In a seventh aspect, a device for information transmission is provided. The device includes a memory and a processor. The memory is configured to store instructions. The processor is configured to execute an instruction stored in the memory and when the processor executes the instruction stored in the memory, the processor is caused to perform the method in the first aspect and any optional implementation of the first aspect.

In an eighth aspect, a device for information transmission is provided. The device includes a memory and a processor. The memory is configured to store instructions. The processor is configured to execute an instruction stored in the memory and when the processor executes the instruction stored in the memory, the processor is caused to perform the method in the second aspect and any optional implementation of the second aspect.

In a ninth aspect, a device for information transmission is provided. The device includes a memory and a processor. The memory is configured to store instructions. The processor is configured to execute an instruction stored in the memory and when the processor executes the instruction stored in the memory, the processor is caused to perform the method in the third aspect and any optional implementation of the third aspect.

In a tenth aspect, a computer storage medium is provided. The computer storage medium stores program code used for executing the method in the above first aspect and any optional implementation of the first aspect.

In an eleventh aspect, a computer storage medium is provided. The computer storage medium stores program code used for executing the method in the above second aspect and any optional implementation of the second aspect.

In a twelfth aspect, a computer storage medium is provided. The computer storage medium stores program code used for executing the method in the above third aspect and any optional implementation of the third aspect.

BRIEF DESCRIPTION OF DRAWINGS

In order to more clearly illustrate the technical solutions of the embodiments of the present disclosure, the drawings used in the embodiments or the related art description will be briefly described below. It is apparent that the drawings in the following description are only some embodiments of the present disclosure, those skilled in the art can obtain other drawings according to the drawings without any creative work.

DETAILED DESCRIPTION

The technical solutions in the embodiments of the disclosure will be clearly and completely described below in conjunction with the drawings in the embodiments of the disclosure. It is apparent that the described embodiments are only a part of embodiments of the disclosure, rather than all of the embodiments. Based on the embodiments of the disclosure, all of other embodiments, acquired by a person skilled in the art without creative work, fall within the scope of protection of the disclosure.

In some embodiments, a Device to Device (D2D) communication may refer to a Vehicle to Vehicle (V2V) communication, a V2X communication or an X2X communication. In the V2X communication or the X2X communication, X can refer to any device with wireless receiving and transmitting capabilities such as but not limited to wireless devices moving slowly, in-vehicle devices moving fast or network control nodes with wireless transmitting and receiving capabilities.

The technical solution of the embodiments of the present disclosure can be applied to various communication systems, for example, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a Universal Mobile Telecommunication System (UMTS), and other current communication systems. The technical solution of the embodiments of the present disclosure can be especially applied to future 5G systems.

The terminal device in the embodiments of the present disclosure may also refer to a User Equipment (UE), an access terminal, a subscriber unit, a subscriber station, a mobile station, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, or a personal digital assistant (PDA), a handheld device with wireless communication capabilities, a computing device with wireless communication capabilities or other processing device with wireless communication capabilities which is connected to a wireless modem, an in-vehicle device, a wearable device, a terminal device in a future 5G network, or a terminal device in a future evolved Public Land Mobile Network (PLMN).

The network device in the embodiments of the present disclosure may be a device for communicating with a terminal device. The network device may be a Base Transceiver Station (BTS) in a GSM or a CDMA, or may be a base station in a WCDMA system (NodeB (NB)), may also be an Evolutional NodeB (referred to as "eNB" or "eNodeB") in the LTE system, or may be a wireless controller in a Cloud Radio Access Network (CRAN) scenario, or the network device may be a relay station, an access point, an in-vehicle device, a wearable device, and a network device in a future 5G network or a network device in a future evolved PLMN network.

The system information of the embodiments of the present disclosure may be used to acquire related information of the serving cell. The system information mentioned in the embodiments of the present disclosure may include information of multiple System Information Blocks (SIBs), for example, may include at least information about information blocks SIB1, SIB2, SIB3, SIB4, SIB5, SIB6, SIB7 and SIB8.

Herein, the SIB1 mainly includes information associated with cell selection and resident and scheduling information of information block. The SIB2 mainly includes access restriction information, common channel parameters, configuration information of subframes of Multimedia Broadcast multicast service Single Frequency Network (MBSFN). The SIB3 mainly includes information associated with cell reselection. The SIB4 mainly includes reselection information of cells with a same frequency. The SIB5 mainly includes reselection information of cells with different frequencies. The SIB6 mainly includes reselection information of cells with different systems (UMTS Radio Access Network (UTRAN)). The SIB7 mainly includes reselection information of cells with different systems (GSM/EDGE radio access network, GSM/Enhanced Data Rate for GSM Evolution (EDGE) (GERAN)). The SIB8 mainly includes reselection information of cells with different systems (CDMA2000).

Figure 1:
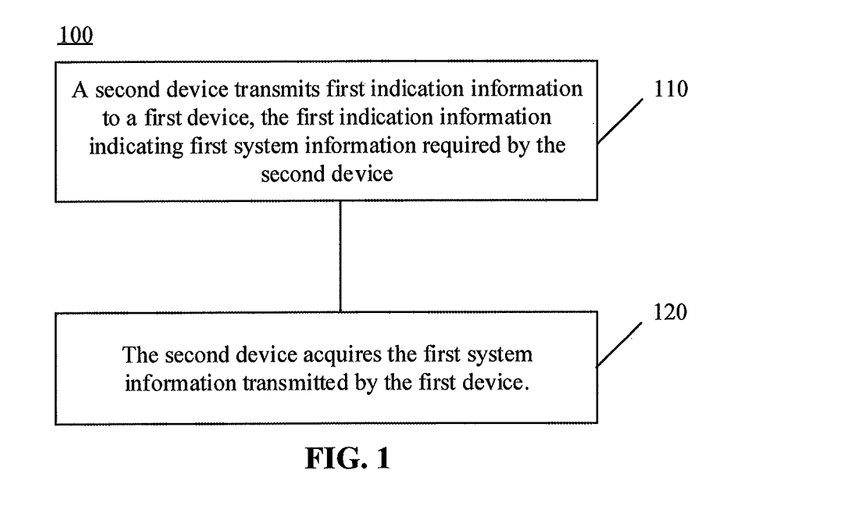
FIG. 1 is a schematic flowchart of a method for information transmission according to an embodiment of the present disclosure.

FIG. 1 is a schematic flowchart of a method 100 for information transmission according to an embodiment of the present disclosure. FIG. 1 illustrates acts or operations of the information transmission method, but these acts or operations are merely examples, and embodiments of the present disclosure may also perform other operations or variations of the respective operations in FIG. 1.

In 110, a second device transmits first indication information to a first device. The first indication information is indicative of first system information required by the second device.

In 120, the second device acquires the first system information transmitted by the first device.

Figure 2:
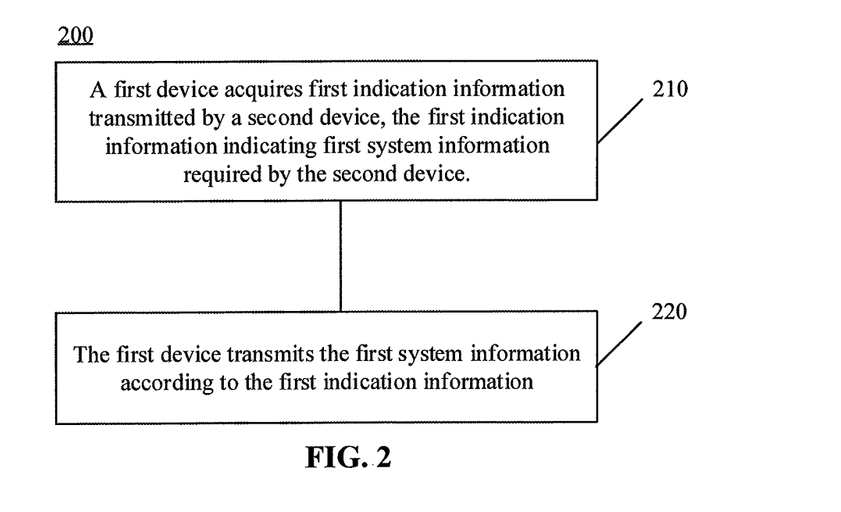
FIG. 2 is a schematic flowchart of a method for information transmission according to an embodiment of the present disclosure.

FIG. 2 is a schematic flowchart of a method 200 for information transmission according to an embodiment of the present disclosure. FIG. 2 illustrates acts or operations of the information transmission method, but these acts or operations are merely examples, and the embodiments of the present disclosure may also perform other operations or variations of the respective operations in FIG. 2.

In 210, a first device acquires first indication information transmitted by a second device. The first indication information is indicative of first system information required by the second device.

In 220, the first device transmits the first system information according to the first indication information.

Therefore, system information can be transmitted only if there is a device which requires the system information and a trigger request for the system information is transmitted, which ensures that the system information can be acquired by the device in time, the transmission efficiency of the system can be improved and the signaling overhead can be reduced, thereby the utilization of resources can be improved.

It is to be understood that the first system information indicated by the above first indication information may be single system information, or may be multiple system information, for example, a set of system information.

Optionally, in the embodiments of the present disclosure, both the first device and the second device can be terminal devices. That is, the embodiments of the present disclosure can applied to a D2D communication. Alternatively, the first device is a network device and the second device is a terminal device.

Optionally, in the embodiments of the present disclosure, the first device can transmit the first system information in multiple manners.

In an implementation, the first device can transmit the first system information by means of a broadcast.

Correspondingly, the second device may receive the first system information that is transmitted by the first device by means of a broadcast.

Therefore, the first device transmits the system information by means of a broadcast after receiving a trigger request for the system information from the second device, so that not only the second device can acquire the system information in time, but also other devices can acquire the system information in an idle state, power consumption and signaling waste caused by converting the other devices from the idle state to a connection state and requesting for the system information from the first device can be avoided when the other devices need to acquire the system information.

In an implementation, the first device can transmit the first system information by means of a multicast.

Correspondingly, the second device may receive the first system information that is transmitted by the first device by means of a multicast.

Optionally, when the first system transmits the first system information by means of a multicast, the group where the second device is located may be determined, and the system information is transmitted to multiple devices in the group. For example, one of the identifier of each device, the identifier of the second device or the group identifier of the group can be carried in a message where the first system information is located.

Therefore, the first device transmits the system information by means of a multicast after receiving a trigger request for the system information from the second device, so that not only the second device can acquire the system information in time, but also other devices can acquire the system information in an idle state, power consumption and signaling waste caused by converting the other devices from the idle state to a connection state and requesting for the system information from the first device can be avoided when the other devices need to acquire the system information.

In an implementation, the first device can transmit the first system information by means of a unicast.

Correspondingly, the second device may receive the first system information that is transmitted by the first device by means of a unicast.

Optionally, when the first system transmits the first system information by means of a unicast, the identifier of the second device can be carried in a message where the first system information is located.

Optionally, in the embodiments of the present disclosure, the first indication information may be carried in the physical layer, and the first indication information may be a first physical layer indication information.

In this case, the second device can transmit the first physical layer indication information by at least one or a combination of a physical channel, a physical resource block, or a physical layer sequence, herein, each or a combination of the physical layer channel, the physical layer resource block and the physical layer sequence corresponds to the first system information.

The first device can acquire the first physical layer indication information via one or a combination of the physical layer channel, the physical layer resource block or the physical layer sequence, herein, each or a combination of the physical layer channel, the physical layer resource block and the physical layer sequence corresponds to the first system information.

Herein, one of a physical layer channel, a physical layer resource block or a physical layer sequence may correspond to single or multiple first system information.

Optionally, in the embodiments of the present disclosure, the first indication information may be carried in a Media Access Control (MAC) layer, and the first indication information may be first MAC layer indication information.

In this case, the second device may transmit the first MAC layer indication information through a control domain, which corresponds to the system message, in a MAC message or through a control bit, which corresponds to the first system information, in the reserved control domain of the MAC message.

The first device may acquire the first MAC layer indication information through a control domain, which corresponds to the first system information, in a MAC message or through a control bit, which corresponds to the first system information, in the reserved control domain of the MAC message.

Optionally, in the embodiments of the present disclosure, the first indication information may be carried in a Radio Resource Control (RRC) layer, and the first indication information may be first RRC layer indication information.

In this case, the second device may transmit the first RRC layer indication information by a control field, which corresponds to the system message, in an RRC message or a control bit, which corresponds to the first system information, in the reserved control domain of the RRC message. Optionally, the RRC message may be an RRCEstablishimentRequest.

The first device may acquire the first RRC layer indication information by a control field, which corresponds to the first system information, in an RRC message or a control bit, which corresponds to the first system information, in the reserved control domain of the RRC message.

Optionally, in the embodiments of the present disclosure, the second device may transmit the first indication information by an RRC message or a MAC message when determining that the physical layer of the second device performs information transmission by means of sharing channel.

Optionally, in the embodiments of the present disclosure, in addition to transmitting the first system information, the first device may further transmit second system information. The second system information is system information associated with the first system information. For example, other system information in the system information set to which the first system belongs is determined as the second system information; and/or other system information utilized by a service utilizing the first system information is determined as the second system information.

Optionally, in the embodiments of the present disclosure, the first device may transmit second indication information in advance. The second indication information is indicative of system information that can be transmitted by the first device.

Specifically, the first device may broadcast the second indication information, or transmit the second indication information by a dedicated signaling.

When the first device transmits the second indication information by the dedicated signaling, the system information that needs to be indicated may be determined according to the receiving end. For example, it is assumed that the first device can transmit three system information sets A, B, and C, and the first device determines that the second device only requires the system information set A, the first device may transmit the second indication information to the second device. The second indication information is only used to indicate that the system information set A can be transmitted by the first device.

After acquiring the system information that can be transmitted by the first device, the second device may request for the required system information from the first device.

The second device may request for the required system information from the first device when the system information is needed, or the second device may predict the system information that may be subsequently used, and request for the system information from the second device.

The first device may transmit the second indication information in multiple manners.

For example, the first device may transmit the second indication information by means of a broadcast, a multicast or a unicast.

Correspondingly, the second device may acquire the second indication information that is transmitted by the first device by means of a broadcast, a multicast or a unicast.

Optionally, in the embodiments of the present disclosure, the second indication information may be carried in a physical layer, and the second indication information may be second physical layer indication information.

The first device may transmit the second physical layer indication information corresponding to different system information or different system information sets through one of different physical layer channels, different physical resource blocks, or different sequences.

Correspondingly, the second device may acquire the second physical layer indication information corresponding to different system information or different system information sets via one of different physical layer channels, different physical resource blocks, or different physical layer sequences.

Optionally, in the embodiments of the present disclosure, the second indication information may be carried in a MAC layer, and the second indication information may be second MAC layer indication information.

The first device carries the second MAC layer indication information corresponding to different system information or different system information sets through different control domains of a MAC message or through different bits of a same control domain of a MAC message Correspondingly, the second device acquires the second MAC layer indication information corresponding to different system information or different system information sets from different control domains of a MAC message or different bits of a same control domain of a MAC message.

Optionally, in the embodiments of the present disclosure, the second indication may be carried in a RRC layer, and the second indication information may be second RRC layer indication information.

The first device carries the second RRC layer indication information corresponding to different system information or different system information sets through different control domains of a RRC message or through different bits of a same control domain of a RRC message.

Correspondingly, the second device acquires the second RRC layer indication information corresponding to different system information or different system information sets from different control domains of a RRC message or different control bits of a same control domain of a RRC message.

Optionally, in the embodiments of the present disclosure, the first device may transmit the second indication information by an RRC message or a MAC message when determining that the physical layer of the first device performs information transmission by means of sharing channel.

Optionally, the system information set mentioned in the embodiments of the present disclosure may be divided according to the SIB. For example, one system information set may include at least one SIB, or the system information set may be divided according to other manners, such as, according to service requirements etc.

Figure 3:
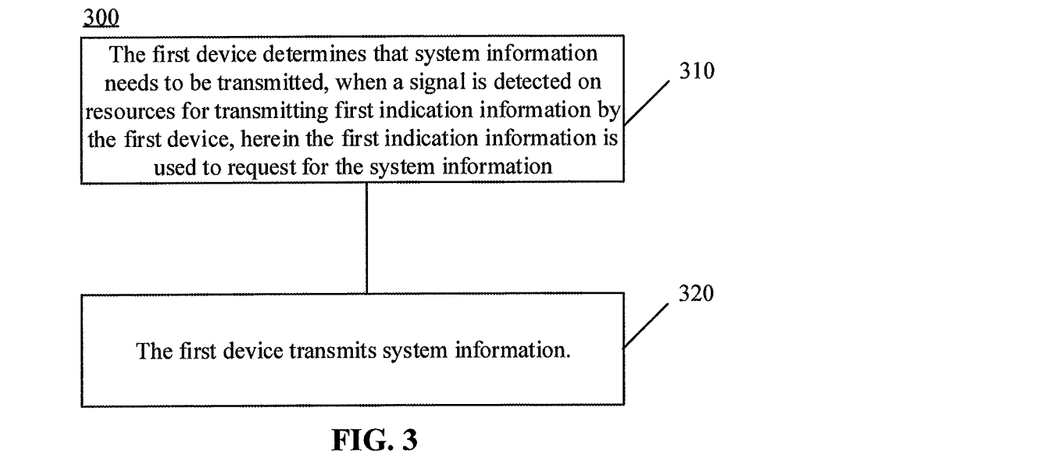
FIG. 3 is a schematic flowchart of a method for information transmission according to an embodiment of the present disclosure.

Optionally, the system information in the embodiments of the present disclosure includes at least one of the following information: information associated with cell selection and resident, scheduling information of information block in which the system information is located, access restriction information, common channel parameters, configuration information of subframes of MBSFN, information associated with cell reselection, reselection information of cells with a same frequency, reselection information of cells with different frequencies, reselection information of cells with different systems, reselection information of cells with different systems, or reselection information of cells with different systems FIG. 3 is a schematic flowchart of a method 300 for information transmission according to an embodiment of the present disclosure. FIG. 3 illustrates the acts or operations of the information transmission method, but these acts or operations are merely examples. Embodiments of the present disclosure may perform other operations or variations of the respective operations in FIG. 3.

In 310, the first device determines that system information needs to be transmitted, when a signal is detected on resources for transmitting first indication information by the first device, herein the first indication information is used to request for the system information.

It is to be understood that a signal is detected may mean that the strength of the detected signal is greater than or equal to a certain intensity threshold.

Optionally, the resources can be one or a combination of at least two of a physical channel, a physical resource block, an antenna port or a sequence of code words.

In 320, the first device transmits system information.

Therefore, when the first device detects the presence of a signal on the resource for transmitting the indication information for requesting for the system information, the first device may transmit the system information corresponding to the indication information without demodulating the information, thereby a problem that the first device fails to transmit the system information in time since the demodulation of the information fails when the indication information is transmitted on the same resource by multiple terminal devices is avoided. And the first device may not need to demodulate the indication information, thereby resource waste is reduced and the power is saved.

Optionally, when the first device determines that the system information needs to be transmitted, the terminal device which is capable of transmitting the first indication information using the resources may be determined, and the required system information is transmitted to the determined terminal device.

For the operation of the second device in the embodiment illustrated in FIG. 3, reference may be made to the foregoing description, and in the method 300, the first device may also previously transmit system information that can be transmitted, and the specific implementation manner and the corresponding implementation of the second device can refer to the above description.

Figure 4:
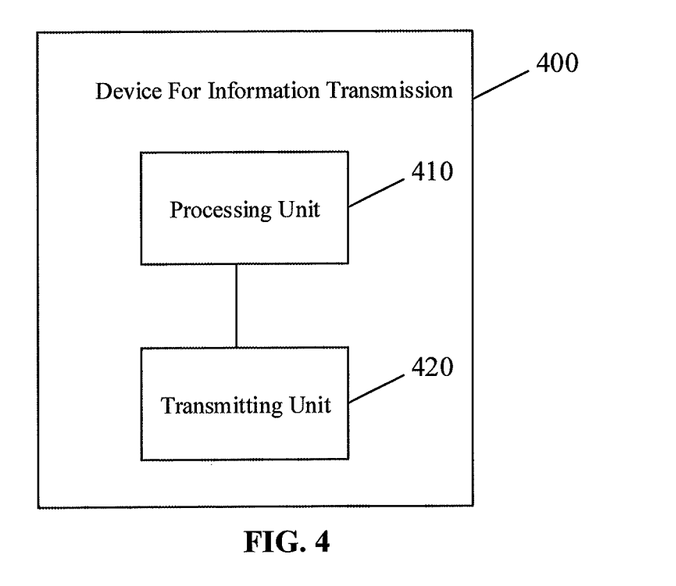
FIG. 4 is a schematic block diagram of a device for information transmission according to an embodiment of the present disclosure.

FIG. 4 is a schematic block diagram of a device 400 for information transmission according to an embodiment of the present disclosure. As illustrated in FIG. 4, the device 400 includes a processing unit 410 and a transmitting unit 420. The processing unit 410 is configured to acquire first indication information transmitted by a second device. Here, the first indication information is used to request system information required by the second device. The transmitting unit 420 is configured to transmit the first system information according to the first indication information.

Optionally, the transmitting unit 420 is further configured to transmit, the first system information according to the first indication information by means of a broadcast, a multicast, or a unicast.

Optionally, both the device 400 and the second device are terminal devices. Alternatively, the device 400 is a network device, and the second device is a terminal device.

Optionally, the processing unit 420 is further configured to acquire the first indication information transmitted by the second device. The first indication information is one of first physical layer indication information, first Media Access Control (MAC) layer indication information, or first Radio Resource Control (RRC) layer indication information.

Optionally, the processing unit 420 is further configured to perform one of: acquiring the first physical layer indication information transmitted by the second device via one or a combination of a physical layer channel, a physical layer resource block or a physical layer sequence, wherein each of the physical layer resource block and the physical layer sequence corresponds to the first system information; acquire the first MAC layer indication information from a control domain, which corresponds to the first system information, in a MAC layer message or from a control bit, which corresponds to the first system information, in a reserved control domain of a MAC layer message, herein the MAC layer message is from the second device; or acquiring the first RRC layer indication information from a control domain, which corresponds to the first system information, in a RRC layer message or from a control bit, which corresponds to the first system information, in a reserved control domain of a RRC layer message, the RRC layer message is from the second device.

Optionally, the transmitting unit 420 is further configured to transmit second indication information. Herein the second indication information is indicative of system information which can be transmitted by the device 400.

Specifically, the second indication information may be transmitted by means of a broadcast or the second indication information may be transmitted by a dedicated signaling.

Optionally, the transmitting unit 420 is further configured to broadcast the second indication information, herein the second indication information is second physical layer indication information, second MAC layer indication information, or second RRC layer indication information.

Optionally, the transmitting unit 420 is further configured to perform one of: transmitting the second physical layer indication information corresponding to different system information or different system information sets through one of different physical layer channels, different physical resource blocks, or different physical layer sequences; carrying the second RRC layer indication information corresponding to different system information or system information sets through different control domains of a RRC message or through different bits of a same control domain of a RRC message; or carrying the second MAC layer indication information corresponding to different system information or system information sets through different control domains of a MAC message or through different bits of a same control domain of a MAC message.

Optionally, the system information includes at least one of the following information: information associated with cell selection and resident, scheduling information of information block in which the system information is located, access restriction information, common channel parameters, configuration information of subframes of MBSFN, information associated with cell reselection, reselection information of cells with a same frequency, reselection information of cells with different frequencies, reselection information of cells with different systems, reselection information of cells with different systems, or reselection information of cells with different systems.

Optionally, the processing unit 410 is further configured to determine second system information, herein the second system information is system information associated with the first system information. The transmitting unit 420 is further configured to transmit the second system information.

Optionally, the processing unit 410 is further configured to perform at least one of: determine, as the second system information, other system information in the system information set to which the first system belongs, or determine, as the second system information, other system information utilized by a service utilizing the first system information.

Figure 5:
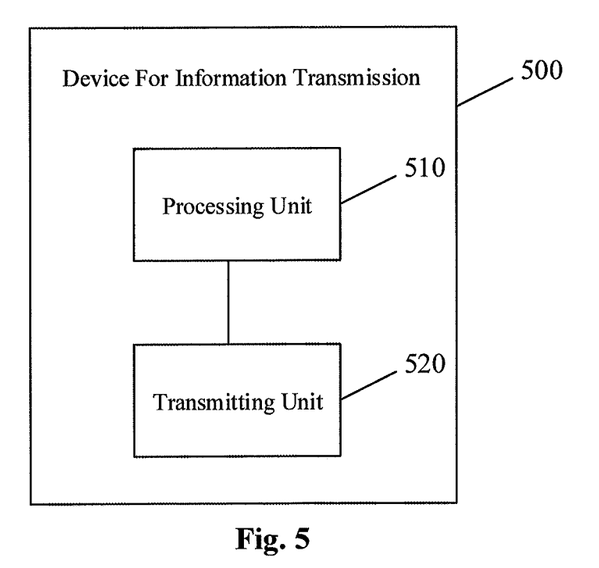
FIG. 5 is a schematic block diagram of a device for information transmission according to an embodiment of the present disclosure.

FIG. 5 is a schematic block diagram of a device 500 for information transmission according to an embodiment of the present disclosure. As illustrated in FIG. 5, the device 500 includes a processing unit 510 and a transmitting unit 520, herein the processing unit 510 is configured to determine that system information needs to be transmitted when a signal is detected on resources for transmitting first indication information, herein the first indication information is used to request the system information; the transmitting unit 520 is configured to transmit the system information.

Optionally, the processing unit 510 is further configured to determine a terminal device configured to capable of transmitting the first indication information using the resources; the transmitting unit 520 is further configured to transmit the system information to the terminal device.

Optionally, the resources can be one or a combination of at least two of a physical channel, a physical resource block, an antenna port or a sequence of code words.

Figure 6:
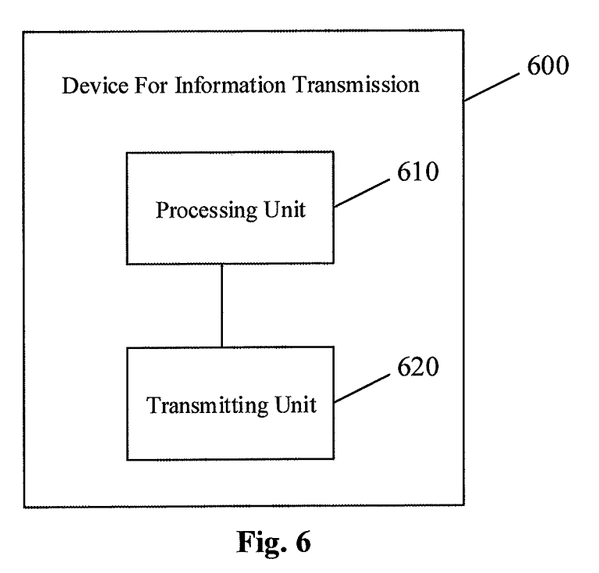
FIG. 6 is a schematic block diagram of a device for information transmission according to an embodiment of the present disclosure.

FIG. 6 is a schematic block diagram of a device 600 for information transmission according to an embodiment of the present disclosure. As illustrated in FIG. 6, the device 600 includes a transmitting unit 610 and a processing unit 620. The transmitting unit 610 is configured to: transmit first indication information to a first device. Herein the first indication information is used to request first system information required by the device 600. The processing unit 620 is configured to acquire the system information transmitted by the first device.

Optionally, the processing unit 620 is further configured to acquire the first system information that is transmitted by the first device by means of at least one of a broadcast, a multicast or a unicast.

Optionally, the first device is a terminal device, and the device 600 is a terminal device; or the first device network device, and the device 600 is a terminal device.

Optionally, the transmitting unit 610 is further configured to: transmit the first indication information to the first device, herein the first indication information is first physical layer indication information, first Media Access Control (MAC) layer indication information, or first Radio Resource Control (RRC) layer indication information.

Optionally, the transmitting unit 610 is further configured to perform one of: transmitting the first physical layer indication information through one of a physical layer channel, a physical layer resource block or a physical layer sequence, herein each of the physical layer resource block and the physical layer sequence corresponds to the first system information; transmitting the first MAC layer indication information through a control domain, which corresponds to the system information, in a MAC message or through a control bit, which corresponds to the first system information, in a reserved control domain of a MAC message; or transmitting the first RRC layer indication information through a control domain, which corresponds to the system information, in a RRC message or through a control bit, which corresponds to the first system information in a reserved control domain of a RRC message.

Optionally, before the transmitting unit 610 transmits the first MAC layer indication information or the first RRC layer indication information, the processing unit 620 is further configured to determine that the physical layer of the device performs information transmission by means of sharing channel.

Optionally, before the transmitting unit 610 transmits the first indication information to the first device, the processing unit 620 is further configured to: acquire second indication information that is transmitted by the first device. Herein the second indication information is indicative of the system information which can be transmitted by the first device. And the processing unit 620 is configured to transmit the first indication information to the first device according to the second indication information. Here, the system information indicated by the first indication information belongs to the system information which can be transmitted by the first device.

Optionally, the processing unit 620 is further configured to acquire second physical layer indication information, second MAC layer indication information or second RRC layer indication information which are transmitted by the first device.

Optionally, the processing unit 620 is further configured to perform one of: acquiring the second physical layer indication information corresponding to different system information or different system information sets via one of different physical layer channels, different physical resource blocks, or different physical layer sequences; acquiring the second RRC layer indication information corresponding to different system information or different system information sets from different control domains of a RRC message or from different control bits of a same control domain of a RRC message; or acquiring the second MAC layer indication information corresponding to different system information or different system information sets from different control domains of a MAC message or from different control bits of a same control domain of a MAC message.

Optionally, the system information includes at least one of the following information: information associated with cell selection and resident, scheduling information of information block in which the system information is located, access restriction information, common channel parameters, configuration information of subframes of MBSFN, information associated with cell reselection, reselection information of cells with a same frequency, reselection information of cells with different frequencies, reselection information of cells with different systems, reselection information of cells with different systems, or reselection information of cells with different systems.

Figure 7:
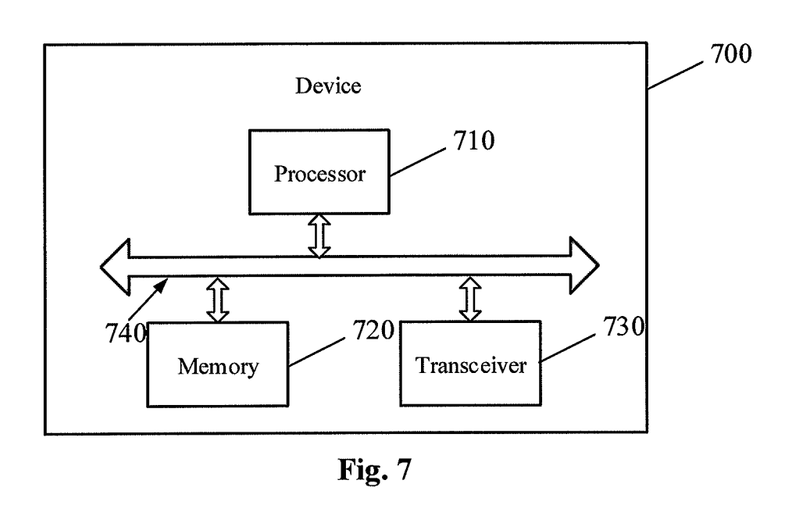
FIG. 7 is a schematic block diagram of a device for information transmission according to an embodiment of the present disclosure.

FIG. 7 is a schematic block diagram of a device 700 according to an embodiment of the present disclosure. The device 700 includes a processor 710, a memory 720, and a transceiver 730. The memory 720 is configured to store program instructions. Processor 710 can call program instructions stored in the memory 720. The transceiver 730 is for external communication. Optionally, the device 700 also includes a bus system 740 that interconnects the processor 710, the memory 720, and the transceiver 730.

Optionally, the device 700 may correspond to the foregoing first device, and may implement corresponding operations of the first device in FIG. 2 and the optional implementation, and may also implement corresponding operations of the first device in FIG. 3 and the optional implementation.

Optionally, the device may correspond to the foregoing second device, and may implement the corresponding operations of the second device in FIG. 2 and the optional implementation.

In the following, the device 700 is first treated as a device which may implement corresponding operations of the first device in FIG. 2 and the optional implementation.

Specifically, the processor 710 is configured to call the instruction stored in the memory 720 to perform the following operations: acquiring first indication information transmitted by the second device. Here, the first indication information is indicative of first system information required by the second device. The first system information is transmitted by the transceiver 730 according to the first indication information.

Optionally, the processor 710 is configured to call the instructions stored in the memory 720 to further perform the following operations: using the transceiver 730 to transmit the first system information according to the first indication information by means of a broadcast, a multicast or a unicast.

Optionally, the device 700 is a terminal device, and the second device is a terminal device; or the device 700 is a network device, and the second device is a terminal device.

Optionally, the processor 710 is configured to call the instruction stored in the memory 720 to further perform the following operations: acquiring the first indication information transmitted by the second device. Here, the first indication information is one of first physical layer indication information, first Media Access Control (MAC) layer indication information, or first Radio Resource Control (RRC) layer indication information.

Optionally, the processor 710 is configured to call the instruction stored in the memory 720 to further perform one of the following operation: acquiring the first physical layer indication information transmitted by the second device via one or a combination of a physical layer channel, a physical layer resource block or a physical layer sequence, herein each or a combination of the physical layer channel, the physical layer resource block and the physical layer sequence corresponds to the first system information; acquiring the first MAC layer indication information from a control domain, which corresponds to the first system information, in a MAC layer message or from a control bit, which corresponds to the first system information, in a reserved control domain of a MAC layer message, herein the MAC layer message is from the second device; or acquire the first RRC layer indication information from a control domain, which corresponds to the first system information, in a RRC layer message or from a control bit, which corresponds to the first system information, in a reserved control domain of a RRC layer message, wherein the RRC layer message is from the second device.

Optionally, the processor 710 is configured to call an instruction stored in the memory 720 to further perform the operation of: using the transceiver 730 to broadcast second indication information. Here, the second indication information is indicative of system information which can be transmitted by the first device 700.

Optionally, the processor 710 is configured to call the instruction stored in the memory 720 to further perform the following operations: transmitting, by the transceiver 730, the second indication information. Here, the second indication information is second physical layer indication information, second MAC layer indication information or second RRC layer indication information.

Specifically, the second indication information may be transmitted by means of a broadcast or the second indication information may be transmitted by a dedicated signaling.

Optionally, the processor 710 is configured to call the instructions stored in the memory 720 to perform one of the following operations: using the transceiver 730 to transmit the second physical layer indication information corresponding to different system information or different system information sets through one of different physical layer channels, different physical resource blocks, or different physical layer sequences; carrying the second RRC layer indication information corresponding to different system information or system information sets through different control domains of a RRC message or through different bits of a same control domain of a RRC message; or carrying the second MAC layer indication information corresponding to different system information or system information sets through different control domains of a MAC message or through different bits of a same control domain of a MAC message.

Optionally, information associated with cell selection and resident, scheduling information of information block in which the system information is located, access restriction information, common channel parameters, configuration information of subframes of MBSFN, information associated with cell reselection, reselection information of cells with a same frequency, reselection information of cells with different frequencies, reselection information of cells with different systems, reselection information of cells with different systems, or reselection information of cells with different systems.

In the following, the device 700 is treated as a device which may implement corresponding operations of the second device in FIG. 1 and the optional implementation.

Specifically, the processor 710 is configured to call an instruction stored in the memory 720 to perform the following operations: using the transceiver 730 to transmit first indication information to the first device; and acquiring the first system information transmitted by the first device. Here, the first indication information is used to request first system information required by the device 700.

Optionally, the processor 710 is configured to call the instructions stored in the memory 720 to further perform the following operations: acquiring the first system information which is transmitted by the first device by means of a broadcast, a multicast or a unicast.

Optionally, the first device is a terminal device, and the device 700 is a terminal device. Alternatively, the first device network device, and the device 700 is a terminal device.

Optionally, the processor 710 is configured to call the instruction stored in the memory 720 to perform the following operations: using the transceiver 730 to transmit the first indication information to the first device. Here, the first indication information is first physical layer indication information, first Media Access Control (MAC) layer indication information, or first Radio Resource Control (RRC) layer indication information.

Optionally, the processor 710 is configured to call the instruction stored in the memory 720 to perform one of the following operations: using the transceiver 730 to transmit the first physical layer indication information through one or a combination of a physical layer channel, a physical layer resource block or a physical layer sequence, herein each or a combination of the physical layer channel, the physical layer resource block and the physical layer sequence corresponds to the first system information; using the transceiver 730 to transmit the first MAC layer indication information through a control domain, which corresponds to the system information, in a MAC message or through a control bit, which corresponds to the first system information, in a reserved control domain of a MAC message; or using the transceiver 730 to transmit the first RRC layer indication information through a control domain, which corresponds to the system information, in a RRC message or through a control bit, which corresponds to the first system information, in a reserved control domain of a RRC message.

Optionally, the processor 710 is configured to call the instruction stored in the memory 720 to further perform the following operations: before use the transceiver 730 to transmit the first MAC layer indication information or the first RRC layer indication information, determining that the physical layer of the device 700 performs information transmission by means of sharing channel.

Optionally, the processor 710 is configured to call the instruction stored in the memory 720 to perform the following operations: before use the transceiver 730 to transmit the first indication information to the first device, acquiring a second indication information transmitted by the first device; and using the transceiver 730 to transmit the first indication information according to the second indication information. Here, the second indication information is indicative of system information which can be transmitted by the first device. Here, the first system information belongs to the system information which can be transmitted by the first device.

Optionally, the processor 710 is configured to call the instruction stored in the memory 720 to further perform the operations of: acquiring second physical layer indication information, second MAC layer indication information or second RRC layer indication information which are transmitted by the first device.

Optionally, the processor 710 is configured to call the instructions stored in the memory 720 to further perform one of the following operations: acquiring the second physical layer indication information corresponding to different system information or different system information sets via one of different physical layer channels, different physical resource blocks, or different physical layer sequences; acquiring the second RRC layer indication information corresponding to different system information or different system information sets from different control domains of a RRC message or from different control bits of a same control domain of a RRC message; or acquiring the second MAC layer indication information corresponding to different system information or different system information sets from different control domains of a MAC message or from different control bits of a same control domain of a MAC message.

Optionally, information associated with cell selection and resident, scheduling information of information block in which the system information is located, access restriction information, common channel parameters, configuration information of subframes of MBSFN, information associated with cell reselection, reselection information of cells with a same frequency, reselection information of cells with different frequencies, reselection information of cells with different systems, reselection information of cells with different systems, or reselection information of cells with different systems.

In the following, the device 700 is treated as a device which may implement corresponding operations of the first device in FIG. 3 and the optional implementation.

Specifically, the processor 710 is configured to call an instruction stored in the memory 720 to perform the following operations: determining that system information needs to be transmitted, when a signal is detected on resources for transmitting a first indication information, herein the first indication information is used to request for the system information; and using the transceiver 730 to transmit the system information.

Optionally, the processor 710 is configured to call an instruction stored in the memory 720 to further perform the following operations: determining a terminal device which is capable of transmitting the first indication information using the resources; and transmitting the system information to the terminal device.

Optionally, the resources are one or a combination of at least two of a physical channel, a physical resource block, an antenna port or a sequence of code words.

It is to be understood that, as mentioned in the embodiments of the present disclosure, the processor 710 calls the instruction stored in the memory to acquire the indication information or the system information transmitted by the other devices, the transceiver may be used to perform the detection of the information and further perform the demodulation of the information etc.

Those of ordinary skill in the art will appreciate that the elements and algorithm acts of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods for implementing the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the several embodiments provided by the present disclosure, it is to be understood that the disclosed systems, devices, and methods may be implemented in other manners. For example, the device embodiments described above are merely illustrative. For example, the division of the unit is only a logical function division. In actual implementation, there may be another division manner, for example, multiple units or components may be combined or can be integrated into another system, or some features can be ignored or not executed. In addition, the coupling or direct coupling or communication connection illustrated or discussed may be an indirect coupling or communication connection through some interface, device or unit, which may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solution of the present disclosure, which is essential or are the parts contributed to the related art, or is a part of the technical solution, may be embodied in the form of a software product, which is stored in a storage medium, including several instructions are used to cause a computer device (which may be a personal computer, server, or network device, etc.) to perform all or part of the acts of the methods described in various embodiments of the present disclosure. The foregoing storage medium includes a U disk, a mobile hard disk, a Read-Only Memory (ROM), a Random Access Memory (RAM), a magnetic disk, or an optical disc, and the like, which can store program code.

The above is only the specific embodiment of the present disclosure, but the scope of the present disclosure is not limited thereto, any changes or substitutions which can be easily thought by the person skilled in the art will be covered by the technical scope of the present disclosure. Therefore, the scope of the invention should be determined by the scope of the appended claims.

The invention claimed is:

1. A method for information transmission, comprising:
    acquiring, by a first device, first indication information transmitted by a second device, wherein the first indication information is used to request first system information required by the second device, and the first indication information is first physical layer indication information, wherein the acquiring, by the first device, the first indication information transmitted by the second device comprises: acquiring, by the first device, the first physical layer indication information transmitted by the second device via a physical layer resource block corresponding to the first system information requested by the first physical layer indication information, wherein physical layer resource blocks via which the first physical layer indication information is acquired have one-to-one correspondences with pieces of first system information; and
    transmitting, by the first device, the first system information according to the first indication information.

2. The method of claim 1, wherein transmitting, by the first device, the first system information according to the first indication information comprises:
    transmitting, by the first device, the first system information according to the first indication information by means of one of a broadcast, a multicast or a unicast.

3. The method of claim 1, wherein
both the first device and the second device are terminal devices; or
the first device is a network device and the second device is a terminal device.

4. The method of claim 1, further comprising: before acquiring, by the first device, the first indication information transmitted by the second device, transmitting, by the first device, second indication information via broadcasting or dedicated signaling, the second indication information indicating system information which can be transmitted by the first device.

5. The method of claim 4, wherein broadcasting, by the first device, the second indication information comprises:
broadcasting, by the first device, the second indication information, wherein the second indication information is one of second physical layer indication information, second MAC layer indication information or second RRC layer indication information.

6. The method of claim 4, wherein broadcasting, by the first device, the second indication information comprises one of:
transmitting, by the first device, the second physical layer indication information corresponding to different system information or different system information sets through one of different physical layer channels, different physical resource blocks, or different physical layer sequences;
carrying, by the first device, the second RRC layer indication information corresponding to different system information or system information sets through different control domains of a RRC message or different control bits of a same control domain of a RRC message; or
carrying, by the first device, the second MAC layer indication information corresponding to different system information or system information sets through different control domains of a MAC message or through different bits of a same control domain of a MAC message.

7. The method of claim 1, further comprising:
determining, by the first device, second system information, wherein the second system information is system information associated with the first system information; and
transmitting, by the first device, the second system information.

8. The method of claim 7, wherein determining, by the first device, the second system information comprises at least one of:
determining, by the first device, other system information in a system information set to which the first system information belongs as the second system information, or
determining, by the first device, other system information utilized by a service utilizing the first system information as the second system information.

9. The method of claim 1, wherein the first system information comprises at least one of:
information associated with cell selection and resident, scheduling information of information block in which the first system information is located, access restriction information, common channel parameters, configuration information of subframes of Multimedia Broadcast multicast service Single Frequency Network (MBSFN), information associated with cell reselection, reselection information of cells with a same frequency, reselection information of cells with different frequencies, reselection information of cells with different systems.

10. A method for information transmission, comprising:
determining, by a first device, that system information needs to be transmitted, when a sequence is detected on radio resources for transmitting first indication information by the second device, wherein the first indication information is used to request for the system information, and the first indication information is first physical layer indication information, and wherein the first physical layer indication information transmitted by the second device is acquired via a physical layer resource block corresponding to the system information requested by the first physical layer indication information, wherein physical layer resource blocks via which the first physical layer indication information is acquired have one-to-one correspondences with pieces of system information; and
transmitting, by the first device, the system information.

11. The method of claim 10, wherein transmitting, by the first device, the system information comprises determining a terminal device which is capable of transmitting the first indication information using the resources; and
transmitting, by the first device, the system information further comprises transmitting the system information to the terminal device.

12. The method of claim 10, the resources are one or a combination of at least two of a physical channel, a physical resource block, an antenna port or a sequence of code words.

13. A method for information transmission, comprising:
transmitting, by a second device, first indication information to a first device, wherein the first indication information is used to request first system information required by the second device, and the first indication information is first physical layer indication information, wherein transmitting, by the second device, the first indication information to the first device comprises: transmitting, by the second device, the first physical layer indication information through a physical layer resource block corresponding to the first system information requested by the first physical layer indication information, wherein physical layer resource blocks via which the first physical layer indication information is acquired have one-to-one correspondences with pieces of first system information; and
acquiring, by the second device, the first system information transmitted by the first device.

14. The method of claim 13, wherein acquiring, by the second device, the first system information transmitted by the first device comprises:
acquiring, by the second device, the first system information transmitted by the first device by means of one of a broadcast, a multicast or a unicast.

15. The method of claim 13, further comprising: before transmitting, by the second device, the first indication information to the first device,
acquiring, by the second device, second indication information transmitted by the first device, wherein the second indication information indicating system information which can be transmitted by the first device;
transmitting, by the second device, the first indication information to the first device comprises:
transmitting, by the second device, the first indication information to the first device according to the second indication information, wherein the first system information belongs to the system information which can be transmitted by the first device.

16. The method of claim 15, wherein acquiring, by the second device, the second indication information transmitted by the first device comprises:
acquiring, by the second device, second physical layer indication information, second MAC layer indication information or second RRC layer indication information which are transmitted by the first device,
wherein acquiring, by the second device, the second physical layer indication information, the second MAC layer indication information or the second RRC layer indication information which are transmitted by the first device comprises one of:
acquiring, by the second device, the second physical layer indication information corresponding to different system information or different system information sets from one of different physical layer channels, different physical resource blocks, or different physical layer sequences;
acquiring, by the second device, the second RRC layer indication information corresponding to different system information or different system information sets from different control domains of a RRC message or from different control bits of a same control domain of a RRC message; or
acquiring, by the second device, the second MAC layer indication information corresponding to different system information or different system information sets from different control domains of a MAC message or from different control bits of a same control domain of a MAC message.

17. The method of claim 13, further comprising:
receiving, by the second device, second system information transmitted by the first device, wherein the second system information is system information associated with the first system information.

* * * * *